United States Patent [19]

Liné

[11] Patent Number: 5,364,329
[45] Date of Patent: Nov. 15, 1994

[54] MACHINE TOOL FITTED WITH A TOOL MAGAZINE HAVING DISKS

[75] Inventor: Henri Liné, Peymeinade, France

[73] Assignee: Helis S.A., Peymeinade, France

[21] Appl. No.: 166,719

[22] Filed: Dec. 14, 1993

[30] Foreign Application Priority Data

Dec. 15, 1992 [FR] France ............................. 92 15108

[51] Int. Cl.⁵ ........................................... B23Q 3/157
[52] U.S. Cl. ....................................... 483/56; 211/155; 483/67
[58] Field of Search ................. 483/67, 66, 63, 62, 483/56; 211/1.51, 1.52, 1.53, 1.54, 1.55, 1.57, 70.6

[56] References Cited

U.S. PATENT DOCUMENTS

| | | | |
|---|---|---|---|
| 3,526,033 | 9/1970 | Saunders | 483/54 |
| 3,966,052 | 6/1976 | Knaus | 211/70.6 |
| 4,122,598 | 10/1978 | Pegler et al. | 483/54 |
| 4,156,962 | 6/1979 | Haller | 483/67 X |
| 4,394,908 | 7/1983 | Pinchemaille | 211/1.54 |
| 5,300,006 | 4/1994 | Tanaka et al. | 483/56 |

FOREIGN PATENT DOCUMENTS

| | | | |
|---|---|---|---|
| 566763 | 10/1993 | European Pat. Off. | 483/66 |
| 3424178 | 4/1985 | Germany | 483/67 |
| 673607 | 3/1990 | Switzerland | 483/63 |

OTHER PUBLICATIONS

Patent Abstract of Japan, vol. 9, No. 249 (M-419) (1972), 5 Oct. 1985 (JP-A-60 99 541).

*Primary Examiner*—William Briggs
*Attorney, Agent, or Firm*—Wolf, Greenfield & Sacks

[57] ABSTRACT

A machine tool having a vertically movable machining head and an automatic tool changer, and fitted with a tool magazine including two same-diameter superposed disks, namely an upper disk and a lower disk, with tools being distributed around the peripheries thereof, and automatic rotary drive and indexing means for said disks, said machining head and said tool magazine being capable of moving relative to each other to enable a tool to be changed, wherein the lower disk is offset relative to the upper disk towards the machining head through a distance d leaving room for the machining head to take tools from said lower disk or to deposit them thereon.

7 Claims, 2 Drawing Sheets

MACHINE TOOL FITTED WITH A TOOL MAGAZINE HAVING DISKS

The present invention relates to the field of machine tools fitted with tool magazines having disks for an automatic tool changing.

BACKGROUND OF THE INVENTION

There exist tool magazines of different capacities. The tools are distributed around the periphery of a disk that can be rotated and indexed automatically so as to make it possible for the machining head to come and take or deposit its tools without operator intervention.

Given the minimum spacing required by the tools, when using only one disk the size of the magazine quickly becomes prohibitive.

Proposals have already been made to make magazines having two same-diameter disks that are superposed coaxially so as to increase tool storage capacity, but in known solutions, there is to be found:

- either a machining head having an offset spindle enabling tools to be taken without relative displacement of the disks;
- or an intermediate tool-transfer arm placed between the magazine and the machining spindle, thus constituting a solution that is expensive and complicated;
- or else an additional system enabling the lower disk to be displaced relative to the upper disk so as to clear access to the tools on the lower disk.

FR-A-2 259 668 discloses a magazine having two superposed and coaxial disks of different diameters.

OBJECT AND SUMMARY OF THE INVENTION

The object of the present invention is to propose a novel tool magazine having two same-diameter superposed disks and in which the tools on either disk can be taken, in particular by a machining head having a centered spindle, without any need for an intermediate transfer arm or for an additional system for displacing the lower disk.

The invention thus provides a machine tool having a vertically movable machining head and an automatic tool changer, and fitted with a tool magazine including two same-diameter superposed disks, namely an upper disk and a lower disk, with tools being distributed around the peripheries thereof, and automatic rotary drive and indexing means for said disks, said machining head and said tool magazine being capable of moving relative to each other to enable a tool to be changed, wherein the lower disk is offset relative to the upper disk towards the machining head through a distance d leaving room for the machining head to take tools from said lower disk or to deposit them thereon.

Advantageously, both disks are driven synchronously by the same automatic rotary drive and indexing means.

Preferably, the automatic rotary drive and indexing means drive one of said disks which in turn drives the other disk.

Advantageously, the upper disk is mounted to rotated on a vertical shaft and the lower disk is supported by said shaft by means of a support arm fixed to said shaft and extending towards the machining head.

Preferably, the lower disk is fixed to a shaft rotatably mounted on said support arm and driven in a 1/1 ratio by the upper disk.

BRIEF DESCRIPTION OF THE DRAWINGS

Other advantages and characteristics of the invention appear on reading the following description given by way of non-limiting example and made with reference to drawings, in which.

MORE DETAILED DESCRIPTION

Figure 1:
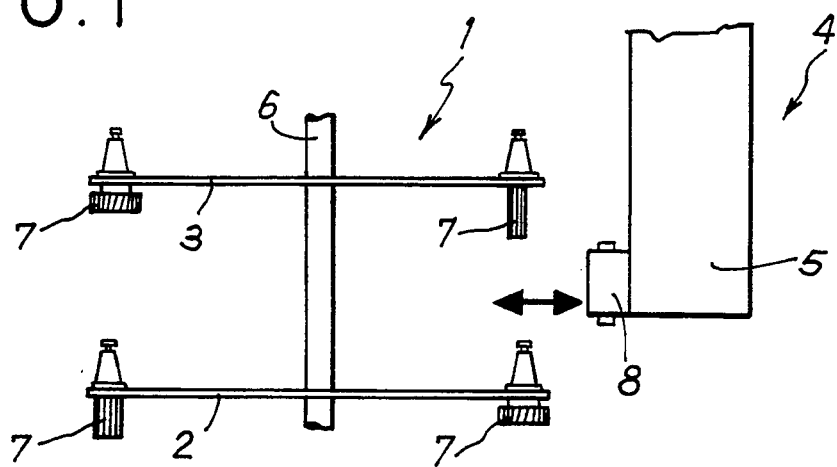
FIGS. 1 to 3 show examples of prior art tool magazines superposed disks.
Figure 2:
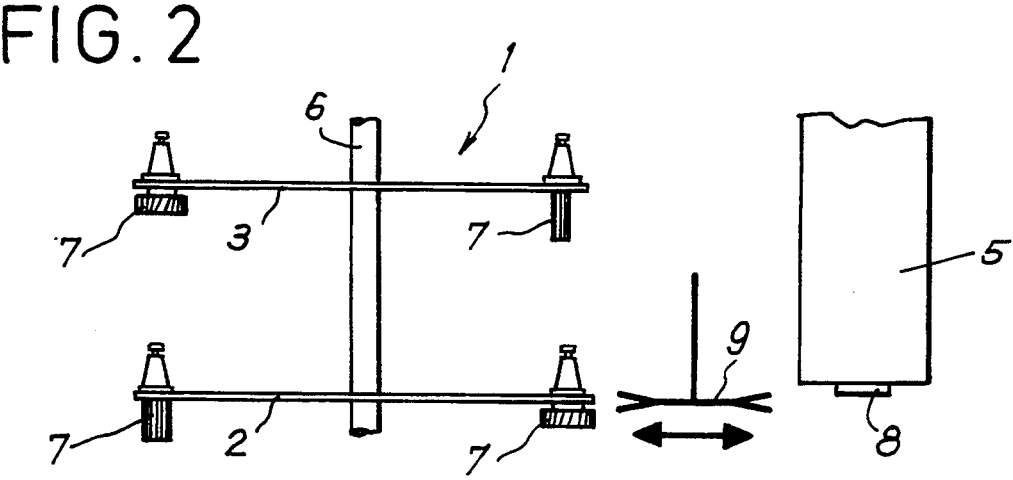
Figure 3:
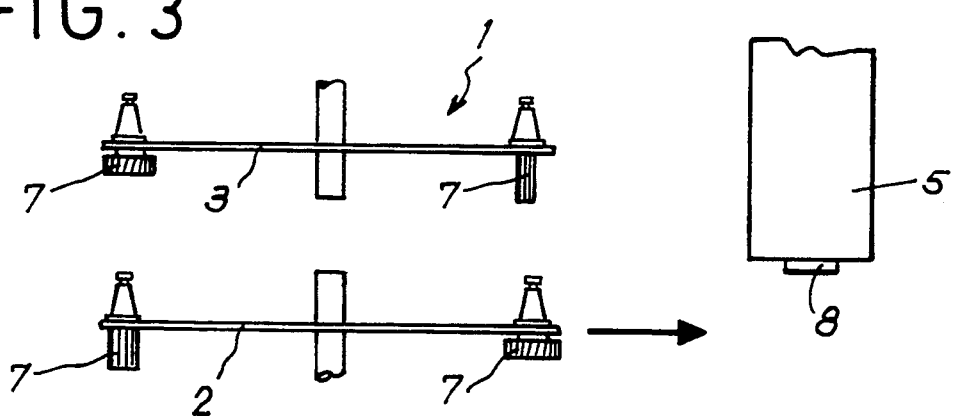

FIGS. 1 to 3 show the disposition of a tool magazine 1 of the present state of the art, the magazine comprising two superposed disks 2 and 3 and being intended for fitting to a machine tool 4 that is represented solely by its machining head 5.

In FIG. 1, both disks 2 and 3 are mounted to rotate on a common shaft 6 and they carry tools 7 at their peripheries. In this example, the machining head 5 has a spindle 8 offset towards the disks 2 and 3 and the spacing between the disks 2 and 3 is greater than the height of the spindle 8 so as to enable the spindle 8 to take hold of a tool on the lower disk 2. The machining head 5 is movable vertically and horizontally towards the tool magazine 1. This embodiment requires a machining head having an offset spindle.

In the embodiment shown in FIG. 2, the machining 5 has a centered spindle 8. In this case, a transfer arm 9 that is movable vertically and horizontally is provided for the purpose of taking a tool 7 from either of the superposed disks 2 and 3 that are likewise both mounted to rotate on a common shaft 6, and to transfer the tool to the spindle 8, or conversely to transfer the tool from the spindle 8 to one or other of the disks 2 and 3. In this case, the distance between the two disks 2 and 3 is independent of the height of the spindle 8.

FIG. 3 shows another embodiment of a tool magazine 1 having two superposed and coaxial disks 2 and 3 in which the lower disk 5 can be displaced by an appropriate device towards the machining head 5 having a centered spindle 8, thereby clearing access to the tools on the lower disk 2 for the purpose of changing a tool.

Figure 4:
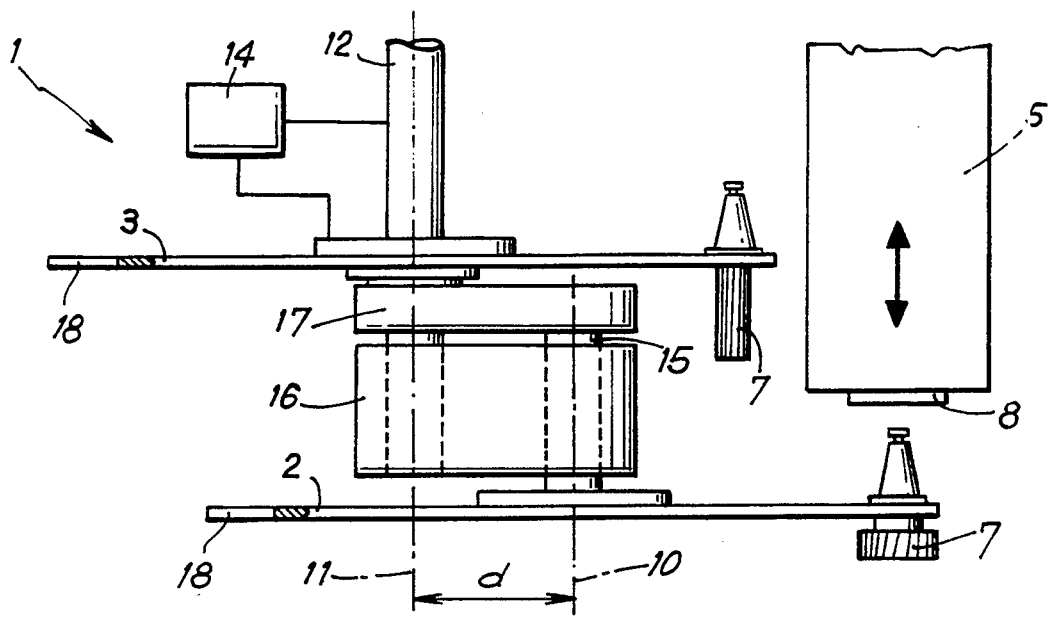
FIG. 4 is a side view of a two-disk tool magazine of the present inaction fitted to a machine tool having a machining head with a centered spindle.
Figure 5:
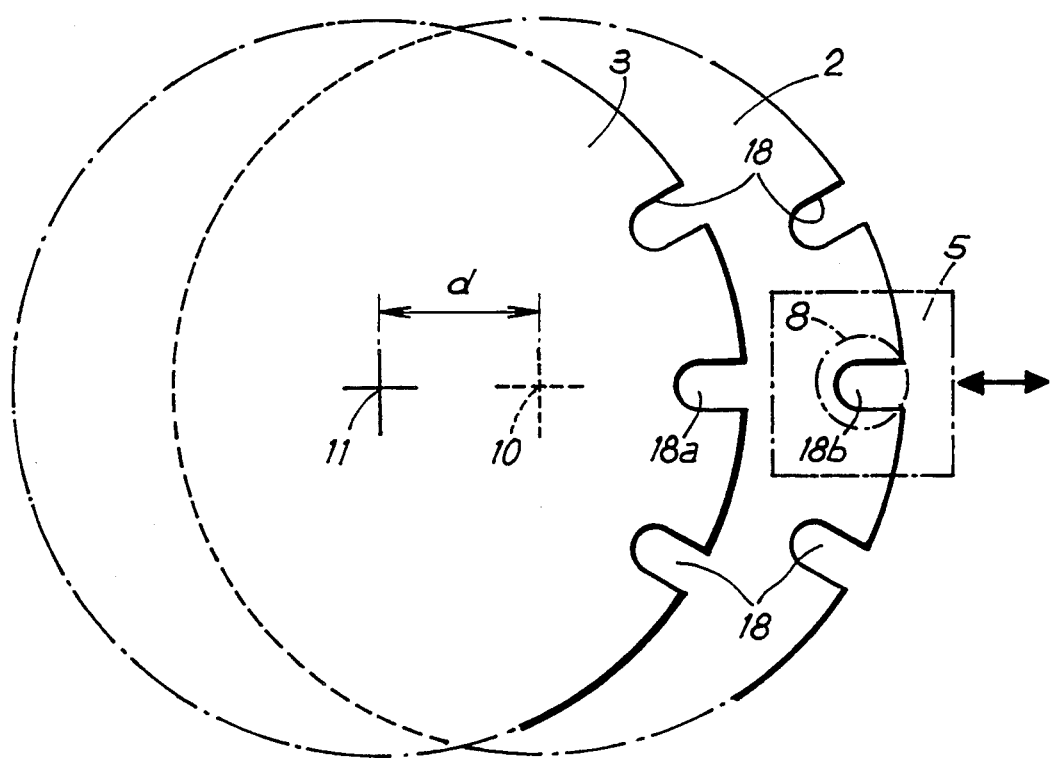
FIG. 5 is a diagrammatic plan view of the tool magazine of the invention.

FIGS. 4 and 5 show a tool magazine 1 in accordance with the present invention and designed for fitting to a machine tool having a machining head 5 that is vertically movable and that has a centered spindle 8.

The tool magazine 1 has two superposed disks 2 and 3 with respective vertical axes 10 and 11 that are offset relative to each other. The axis 10 of the lower disk 2 is offset towards the machining head 5 away from the axis 11 of the upper disk 3 by a distance d that leaves room for the machining head 5 to take tools from the bottom disk 2, or to deposit them thereon.

The machining head 5 can move in the plane defined by the axes 10 and 11. The upper disk 3 is mounted to rotate on a stationary vertical shaft 12 whose bottom end lies beneath the plane 13 of the upper disk 3. The shaft is rotated and indexed by a conventional drive system 14 that comprises a variable speed motor, a gear box, and an encoder, the drive system being interposed between the upper disk 3 and the stationary shaft 12 or the frame of the tool magazine 1.

The lower disk 2 is secured to a vertical shaft 15 mounted to rotate relative to a stationary support arm 16 at the bottom end of the stationary shaft 12. The shaft 15 is rotated by the upper disk 3 by drive means that include, for example, a cog belt 17 mounted on two pulleys, one fixed to the upper disk 3 and the other to the shaft 15. These two pulleys have the same diameters so as to enable the lower disk 2 to be driven by the upper disk 3 in a 1/1 ratio and synchronously.

The two disks 2 and 3 are of the same diameter and they preferably include the same number of tool notches 18 disposed in such a manner that when the upper disk 3 presents a notch 18a in alignment with the two axes 10 and 11 and adjacent to the machining head 5, the lower disk 2 also has a notch 18b in alignment with the two axes 10 and 11.

This simple disposition of the two disks 2 and 3 makes it possible to double tool storage capacity cheaply while occupying space that is much the same as that occupied by a tool magazine having a single disk. The width of the proposed tool magazine 1 is equal to the diameter of the disks 2 and 3, while the length thereof is equal to said diameter plus the offset d between the axes 10 and 11.

I claim:

1. A machine tool having a vertically movable machining head and an automatic tool changer, and fitted with a tool magazine including two same-diameter superposed disks, namely an upper disk and a lower disk, with tools being distributed around the peripheries thereof, and automatic rotary drive and indexing means for said disks, said machining head and said tool magazine being capable of moving relative to each other to enable a tool to be changed, wherein the lower disk is offset relative to the upper disk towards the machining head through a distance d leaving room for the machining head to take tools from said lower disk or to deposit them thereon.

2. A machine tool according to claim 1, wherein both disks are driven synchronously by the same automatic rotary drive and indexing means.

3. A machine tool according to claim 2, wherein the automatic rotary drive and indexing means drive one of said disks which in turn drives the other disk.

4. A machine tool according to claim 3, wherein the automatic rotary drive and indexing means drive the upper disk.

5. A machine tool according to claim 4, wherein the upper disk is mounted to rotate on a vertical shaft and wherein the lower disk is supported by said shaft by means of a support arm fixed to said shaft and extending towards the machining head.

6. A machine tool according to claim 5, wherein the lower disk is fixed to a shaft rotatably mounted on said support arm and driven in a 1/1 ratio by the upper disk.

7. A machine tool according to claim 1, wherein the machining tool has a spindle that is centered.

* * * * *